Dec. 19, 1922.　　　　　　　　　　　　　　　　　　1,439,621.
C. M. EVANS.
CAB FOR AUTOMOBILE TRUCKS.
FILED MAY 19, 1921.　　　　　2 SHEETS—SHEET 1.
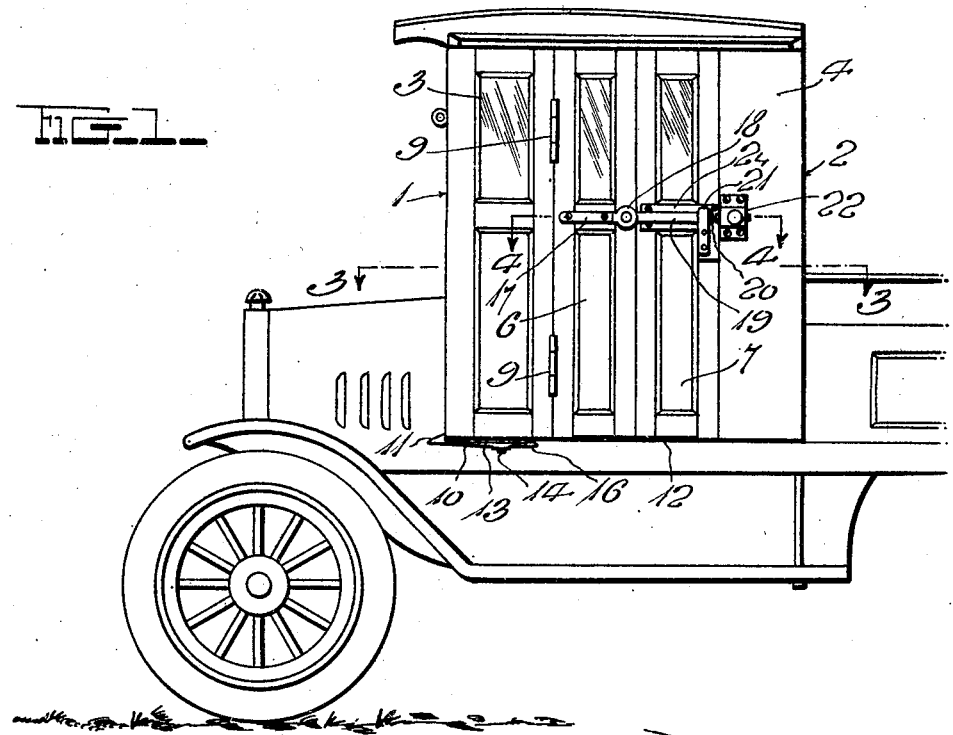
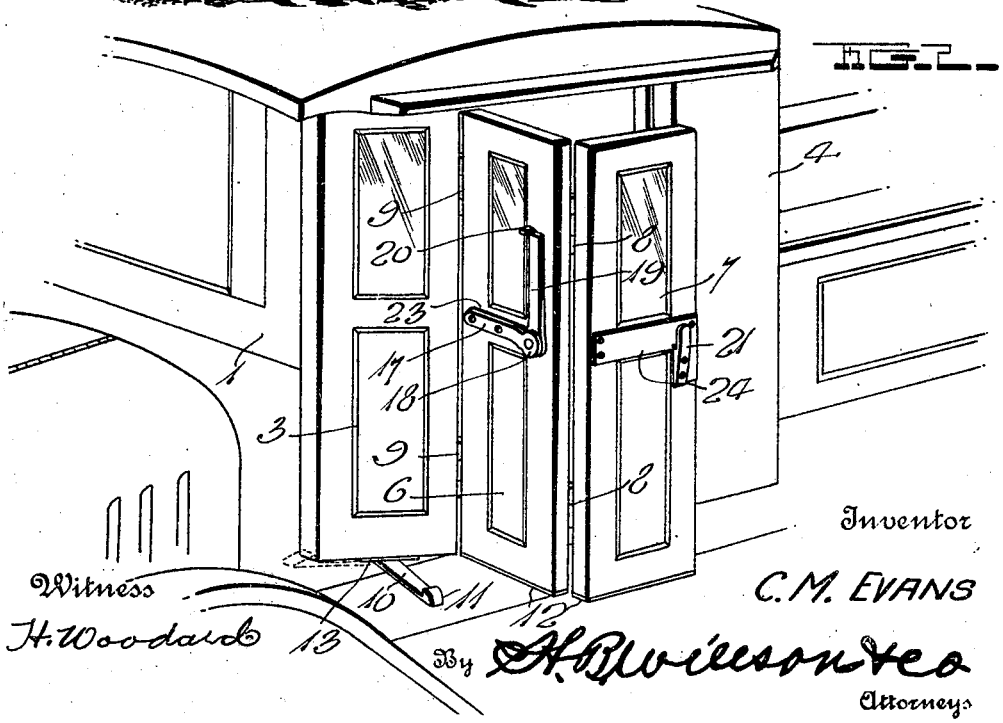
Witness
H. Woodard
Inventor
C. M. Evans
By H. B. Wilson &co
Attorneys Dec. 19, 1922.
C. M. EVANS.
CAB FOR AUTOMOBILE TRUCKS.
FILED MAY 19, 1921.
1,439,621.
2 SHEETS—SHEET 2.
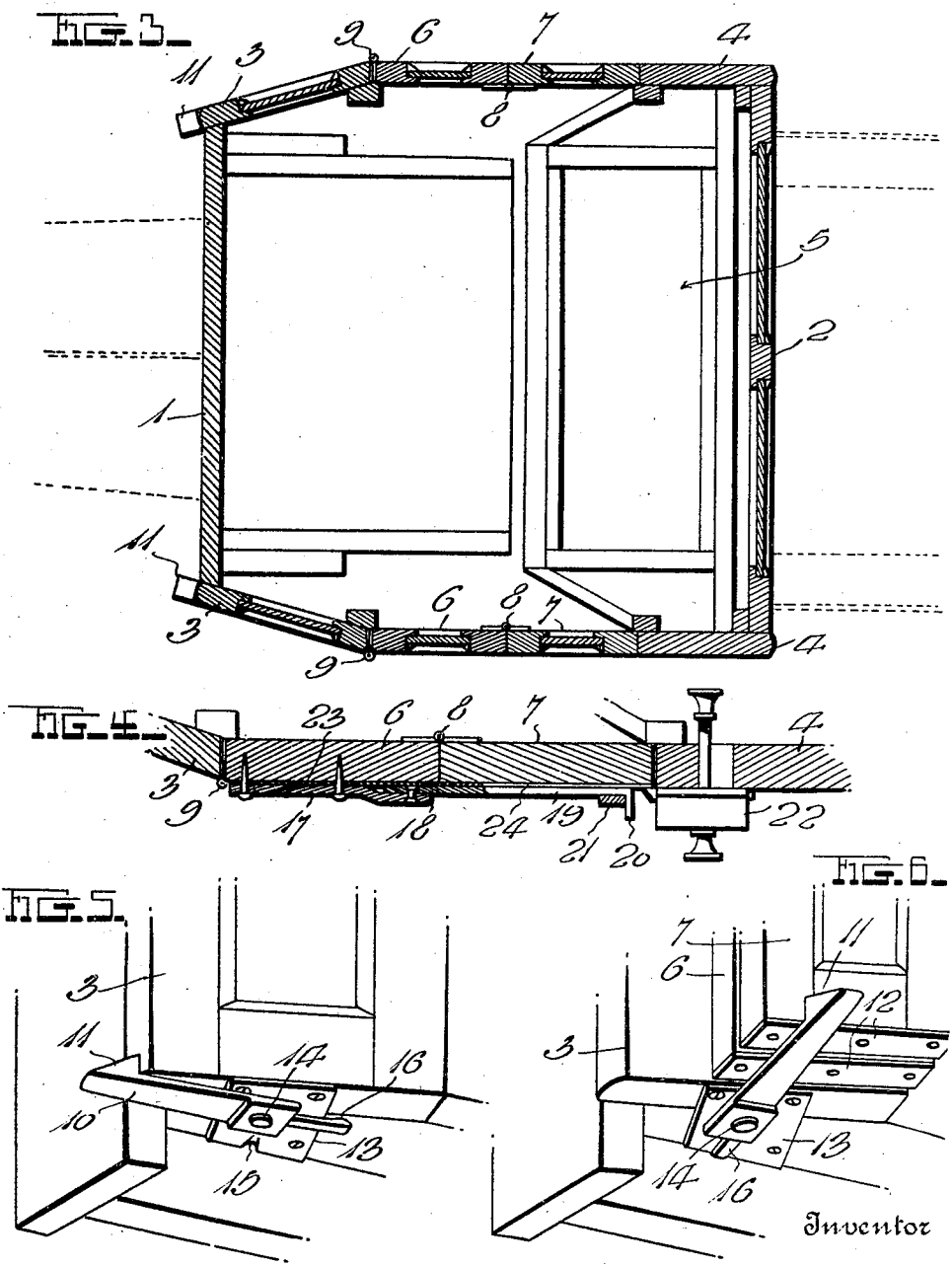
Witness
H. Woodard
Inventor
C. M. Evans
By H. B. Wilson & Co.
Attorneys Patented Dec. 19, 1922.

1,439,621

UNITED STATES PATENT OFFICE.

CLARENCE M. EVANS, OF CORYDON, INDIANA.

CAB FOR AUTOMOBILE TRUCKS.

Application filed May 19, 1921. Serial No. 470,797.

*To all whom it may concern:*

Be it known that I, CLARENCE M. EVANS, a citizen of the United States, residing at Corydon, in the county of Harrison and State of Indiana, have invented certain new and useful Improvements in Cabs for Automobile Trucks; and I do declare the following to be a full, clear, and exact description of the invention, such as will enable others skilled in the art to which it appertains to make and use the same.

This invention relates to an improved cab for use in connection with an automobile truck and one object of the invention is to provide a cab having an improved side wall and door construction, the side wall and doors for each side being so constructed that the doors may be opened and easy entrance and exits permitted at the driver's side of the cab.

Another object of the invention is to provide an improved door which is hingedly mounted for swinging outwardly to an open position and which is further so constructed that it may be formed of sections hingedly connected to permit of folding when it is desired to have the door retained in an open position.

Another object of the invention is to provide improved securing means for securing the sections of the doors against folding, the securing means being positioned upon the opposite sides of the doors from the hinges which connect the sections of the doors and thus providing a door structure which will be strong and durable.

Another object of the invention is to provide a securing means for holding the door sections against folding which will be very strong and effective in use and which will be easy to operate.

Another object of the invention is to provide improved means for securing the doors in an open and folded position against the outer side of the cab wall.

Another object of the invention is to so construct this means for securing the door in an open and folded position, that it may be positioned against a forward wall section when not in use and swung out to one side for engaging the folded door when desired.

Another object of the invention is to so construct this door securing device that it may be resilient and thus have very good engagement with the folded door and further to provide improved means for releasably holding it in the extended and operative position.

This invention is illustrated in the accompanying drawings, wherein:

Figure 1 is a view showing in side elevation the forward portion of an automobile truck provided with the improved cab.

Figure 2 is a perspective view of the forward end portion of the truck with one of the side doors open and partially folded.

Figure 3 is a transverse sectional view through the cab taken along the line 3—3 of Fig. 1.

Figure 4 is an enlarged sectional view through one of the doors and adjacent portions of the cab wall taken along the line 4—4 of Fig. 1.

Figure 5 is a perspective view showing the latch for holding the door in an open and folded position when in an inoperative position beneath the wall of the cab.

Figure 6 is a perspective view showing the latch swung out to an operative position and holding the folded door in the folded position.

This improved cab is to be used in connection with a truck which will have a conventional construction and which is therefore not described in detail. The cab is provided with a forward wall 1 and rear wall 2 and is provided with side walls, each of which is provided with a forward section 3 and a rear section 4. The seat 5 which is built in the rear portion of the cab extends forwardly beyond the line of the rear wall sections 4 and the extended forward portion of the seat is tapered forwardly as shown clearly in Fig. 3 so that with the door at the driver's side open, it will be easy to enter or leave the cab. Doors have been provided for closing the doorways between the rear and forward wall sections 3 and 4 and each of these doors is provided with a forward section 6 and rear section 7 which is hingedly connected with the forward section by hinges 8. The forward section 6 of the door is connected with the forward wall section 3 by hinges 9 and it will thus be seen that the door may be swung open and then if desired folded as shown in Fig. 2 and swung into a folded position against the forward wall section 3 as shown in Fig. 6.

In order to permit the door to be secured in this folded position of Fig. 6, when desired, there has been provided a latching arm 10 which is formed of resilient metal and provided with a door-engaging head 11 at its free end, the head 11 having a sloping cam face so that the latch may be swung to the operative position of Fig. 6 and the folded door then swung to the open and folded position and be properly engaged by the latch. Strips 12 are secured against the outer edge faces of the door sections so that the under edges of these doors will be protected from wear. The latch 10 is pivotally connected with a plate 13 by means of a pivot pin 14 and this plate 13 which is secured beneath the cab as shown clearly in Figs. 5 and 6 is provided with a depression forming a seat or pocket 15 to receive the enlarged head at the free end portion of the tongue 16 extending from the pivoted end of the latching arm 10. By provision of this tongue 16, the latching arm may be securely held in the extended or operative position of Figs. 2 and 6 but at the same time, may be easily moved to the inoperative position of Fig. 5 when desired. It will thus be seen that in hot weather the doors may be opened and moved to the folded position against the forward wall sections 3 where the doors will be out of the way and at the same time will be ready for use in case they are needed. During cold weather or rainy weather, it is desired to have the door sections held in the position of Fig. 3 and prevented from folding. Improved securing means has thus been provided to prevent the door section 7 from having swinging movement to a folded position. This securing is constructed as clearly shown in Figs. 1, 2 and 4 and is provided with a bearing bracket 17 having an enlarged head 18 with which a latching bar or arm 19 is pivotally connected. This latching bar is provided with a finger extension 20 which extends outwardly and provides a handle element by means of which the latching bar may be easily swung from an inoperative position into an operative position. A keeper 21 is secured upon the door section 7 for engagement by the securing bar 19 and it will be readily seen from an inspection of Fig. 4 that when the latching bar 19 is swung into engagement with the keeper 21, the two door sections will be securely held in alinement and the door section 7 will be prevented from swinging to a folded position when the door securing lock or latch 22 is released and the doors swung open. In order to protect the two doors from wear, there has been provided protecting plates 23 and 24 which will serve to prevent the doors from being scarred by the latching bar.

It will thus be seen that there has been provided a cab in which the doors of the side walls will be formed of folded sections which may be securely held against folding and may be swung into an open position with the door sections remaining in alinement. It will be further noted that the doors will be so constructed that they may be readily folded to the folded position against the forward wall section and the folded door securely but releasably held in the folded position. It will be further noted that a very efficient securing means has been provided for releasably holding the door section against folding and that also very efficient means has been provided for folding the doors in the open and folded position, the last named means being so constructed that when not in use, it may be swung beneath the body of the cab. It will also be noted that the cab is so constructed that when the door is open at the driver's side it will be very easy to enter or leave the cab at the driver's side.

I claim:

1. A vehicle cab having side walls each having a rear section and a forward section spaced from the rear section to provide a doorway, doors for closing the doorways, each having a forward section hingedly connected with the forward section of the wall and a rear section hingedly connected with the forward door section for folding against the same when open, and means for releasably holding the door in an open and folded position comprising a plate secured to the under portion of the cab and having a depression forming a seat, a door engaging latch arm pivotally connected with the plate and adapted to engage the folded door sections when swung outwardly, and a tongue extending from the pivoted end of the latch arm for fitting into the seat and releasably holding the arm in an extended position.

2. A structure having a wall provided with a passage, a closure for closing the passage hingedly mounted for swinging outwardly to an open position against the wall, and means for releasably holding the closure in an open position, said means comprising a supporting plate having a seat formed therein, a latching arm pivotally connected with the plate and adapted for engagement with the closure when swung to an operative position, and a tongue extending from the pivot end of the latch arm for fitting into the seat of the plate and releasably holding the arm in the operative position.

3. A fastener for a closure of the character described comprising a bearing plate having a seat, a latching arm pivotally connected with the plate and a tongue extending from the arm for fitting into the seat and securing the arm in an adjusted position.

In testimony whereof I have hereunto set my hand.

CLARENCE M. EVANS.